(12) United States Patent
Shah et al.

(10) Patent No.: US 8,687,621 B2
(45) Date of Patent: Apr. 1, 2014

(54) DYNAMICALLY RIGHT-SIZING PREFIXES FOR NETWORK AND APPLICATION PERFORMANCE

(75) Inventors: Pritam Shah, Fremont, CA (US); Dana Blair, Alpharetta, GA (US); Rahul G. Patel, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 473 days.

(21) Appl. No.: 12/478,343

(22) Filed: Jun. 4, 2009

(65) Prior Publication Data
US 2010/0309795 A1 Dec. 9, 2010

(51) Int. Cl.
*H04L 12/28* (2006.01)
*G06F 15/16* (2006.01)

(52) U.S. Cl.
USPC .................. 370/351; 370/255; 709/238

(58) Field of Classification Search
USPC ......... 370/232, 249, 254, 255, 351–356, 389, 370/390, 392, 395.31, 401, 408, 469; 709/203, 223, 224, 225, 238, 242, 245
See application file for complete search history.

(56) References Cited

U.S. PATENT DOCUMENTS

| | | | |
|---|---|---|---|
| 6,018,524 A * | 1/2000 | Turner et al. .................. | 370/392 |
| 6,512,744 B1 | 1/2003 | Hughes et al. | |
| 6,687,307 B1 | 2/2004 | Anikhindi et al. | |
| 6,725,326 B1 | 4/2004 | Patra et al. | |
| 6,775,737 B1 | 8/2004 | Warkhede et al. | |
| 6,826,621 B1 * | 11/2004 | Kephart et al. ............... | 709/238 |
| 6,917,618 B2 | 7/2005 | Thubert et al. | |
| 6,957,071 B1 | 10/2005 | Holur et al. | |
| 6,970,971 B1 | 11/2005 | Warkhede et al. | |
| 6,981,055 B1 * | 12/2005 | Ahuja et al. .................. | 709/238 |
| 7,110,363 B1 | 9/2006 | Lawrence et al. | |
| 7,154,889 B1 | 12/2006 | Rekhter et al. | |
| 7,190,696 B1 * | 3/2007 | Manur et al. .................. | 370/392 |
| 7,193,968 B1 | 3/2007 | Kapoor et al. | |
| 7,257,560 B2 * | 8/2007 | Jacobs et al. .................. | 705/400 |
| 7,277,399 B1 | 10/2007 | Hughes, Jr. | |
| 7,292,569 B1 | 11/2007 | Smith et al. | |
| 7,307,990 B2 | 12/2007 | Rosen et al. | |
| 7,325,059 B2 * | 1/2008 | Barach et al. ................. | 709/225 |
| 7,333,501 B2 * | 2/2008 | Cook et al. .................... | 370/401 |
| 7,349,982 B2 | 3/2008 | Hannum et al. | |
| 7,356,033 B2 | 4/2008 | Basu et al. | |
| 7,369,556 B1 | 5/2008 | Rekhter et al. | |
| 7,379,433 B1 | 5/2008 | Patel et al. | |
| 7,382,738 B2 | 6/2008 | Ravindran et al. | |

(Continued)

OTHER PUBLICATIONS

Perlman, Radia, "Interconnections Second Edition: Bridges, Routers, Switches, and Internetworking Protocols", Sections 12.1-12.3 pp. 299-321, Addison Wesley Longman, Inc. 2000, 34 pages.

(Continued)

*Primary Examiner* — Michael Thier
*Assistant Examiner* — Prince A Mensah
(74) *Attorney, Agent, or Firm* — Novak Druce Connolly Bove + Quigg LLP

(57) ABSTRACT

In one embodiment, performance parameters may be determined for each of a plurality of network address prefixes in a computer network. Based on the respective performance parameters, the prefixes may be resized through at least one of consolidation of adjacent prefixes and splitting of prefixes, and traffic may then be routed in the computer network based on the resized prefixes.

18 Claims, 7 Drawing Sheets

(56) References Cited

U.S. PATENT DOCUMENTS

| | | | |
|---|---|---|---|
| 7,453,883 B1* | 11/2008 | Lynch et al. | 370/395.32 |
| 7,483,430 B1 | 1/2009 | Yuan et al. | |
| 7,484,237 B2 | 1/2009 | Joly et al. | |
| 7,536,476 B1 | 5/2009 | Alleyne | |
| 7,860,106 B2* | 12/2010 | Kecskemeti | 370/395.31 |
| 7,936,764 B1* | 5/2011 | Krishnan | 370/395.31 |
| 2002/0141343 A1* | 10/2002 | Bays | 370/235 |
| 2002/0145981 A1* | 10/2002 | Klinker et al. | 370/244 |
| 2002/0184393 A1* | 12/2002 | Leddy et al. | 709/250 |
| 2003/0086422 A1* | 5/2003 | Klinker et al. | 370/389 |
| 2003/0088529 A1* | 5/2003 | Klinker et al. | 706/3 |
| 2003/0097470 A1* | 5/2003 | Lapuh et al. | 709/239 |
| 2003/0174717 A1 | 9/2003 | Zabarski et al. | |
| 2003/0191740 A1* | 10/2003 | Stark | 707/1 |
| 2004/0114568 A1 | 6/2004 | Beverly | |
| 2005/0041675 A1* | 2/2005 | Trostle et al. | 370/401 |
| 2005/0131912 A1 | 6/2005 | Lin et al. | |
| 2005/0272438 A1* | 12/2005 | Holur et al. | 455/452.2 |
| 2006/0120288 A1* | 6/2006 | Vasseur et al. | 370/235 |
| 2006/0159095 A1* | 7/2006 | Cook et al. | 370/392 |
| 2006/0165009 A1* | 7/2006 | Nguyen et al. | 370/252 |
| 2006/0182034 A1* | 8/2006 | Klinker et al. | 370/238 |
| 2006/0209885 A1 | 9/2006 | Hain et al. | |
| 2006/0239199 A1 | 10/2006 | Blair et al. | |
| 2006/0239201 A1 | 10/2006 | Metzger et al. | |
| 2006/0268681 A1* | 11/2006 | Raza | 370/216 |
| 2007/0047463 A1* | 3/2007 | Jarvis et al. | 370/254 |
| 2007/0097992 A1 | 5/2007 | Singh et al. | |
| 2008/0084880 A1* | 4/2008 | Dharwadkar | 370/392 |
| 2009/0006647 A1* | 1/2009 | Balonado et al. | 709/238 |

OTHER PUBLICATIONS

Rekhter, Y. et al., RFC 1771, "A Border Gateway Protocol 4 (BGP-4)", Network Working Group, Mar. 1995, pp. 1-54.

"NetFlow Services Solutions Guide", Oct. 2004, Cisco Systems, Inc., San Jose, CA., pp. 1-72.

"NetFlow v9 Export Format", Cisco IOS Release, 2003, Cisco Systems, Inc., San Jose, CA., pp. 1-22.

U.S. Appl. No. 10/980,550, filed Nov. 3, 2004, entitled Method and Apparatus for Automatically Optimizing Routing Operations at the Edge of a Network, by Shah et al., 40 pages.

U.S. Appl. No. 11/337,217, filed Jan. 20, 2006, entitled Link Policy Routing Based on Link Utilization, by Patel et al., 35 pages.

U.S. Appl. No. 11/337,195, filed Jan. 20, 2006, entitled System and Method for Increasing Granularity of Prefix Control in a Computer Network, by Shah et al., 36 pages.

\* cited by examiner

ROUTING TABLE (SIMPLIFIED)
300

| PREFIXES 305 | ROUTING DECISIONS 310 |
|---|---|
| X1/24 | PATH 1 |
| X2/30 | PATH 2 |
| ⋮ | ⋮ |
| Y/16 | PATH 3 |
| ⋮ | ⋮ |
| Z/19 | PATH 4 |
| ⋮ | ⋮ |

ENTRIES 320

FIG. 3

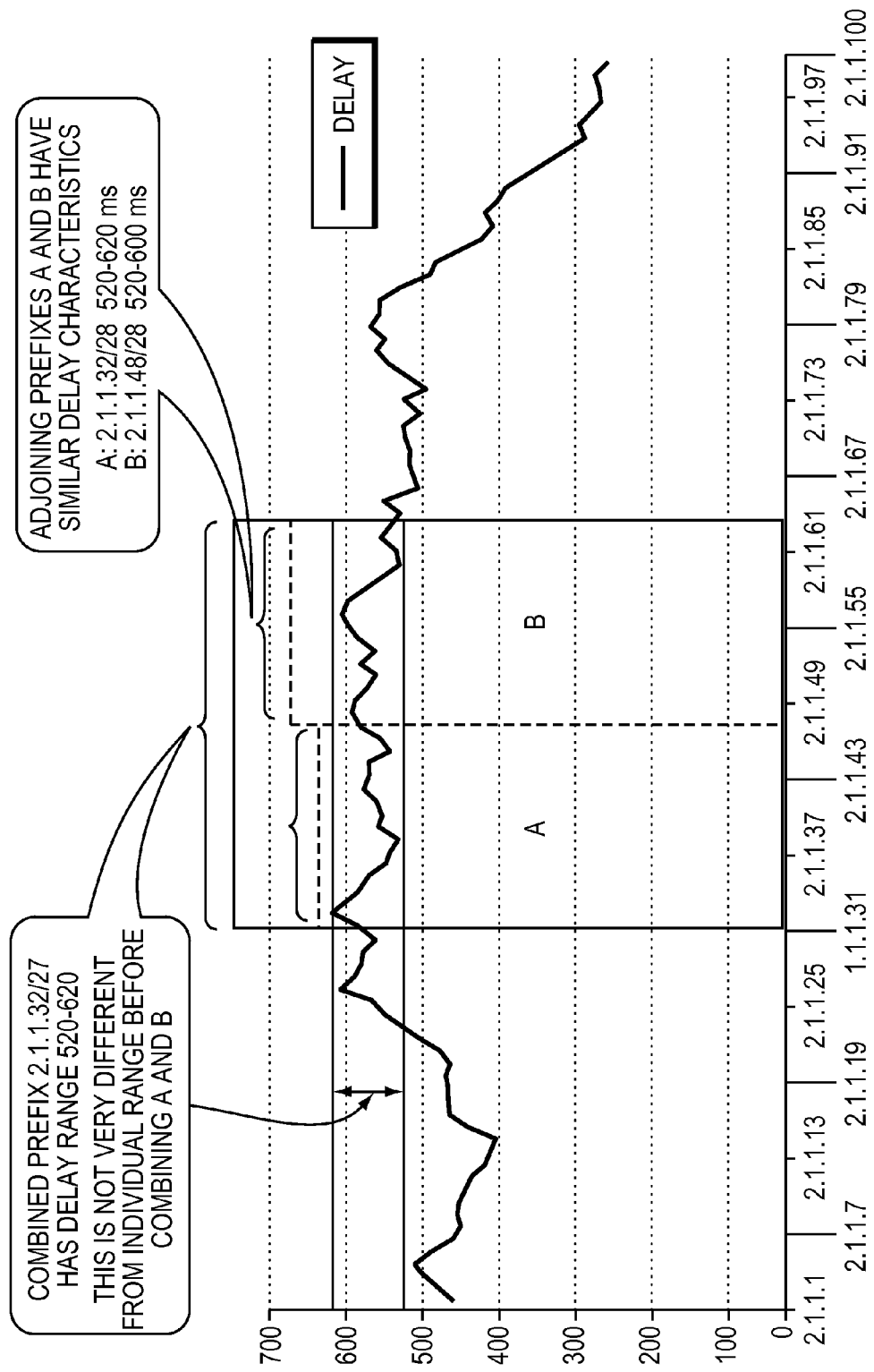

DYNAMICALLY RIGHT-SIZING PREFIXES FOR NETWORK AND APPLICATION PERFORMANCE

TECHNICAL FIELD

The present disclosure relates generally to computer networks, and, more particularly, to performance based routing in computer networks.

BACKGROUND

Network devices typically use routing tables to direct traffic within a computer network based on address prefixes. That is, the table stores the prefixes and a "best route" (based on various factors) over which to route any received packets destined to an address within that prefix. Generally, there is little or no consideration of the volume and performance of the traffic being directed within routing tables, and the "best route" decisions are made on static factors. In particular, applying a routing policy to a prefix may benefit the performance of certain hosts/subnets within the prefix, while degrading the performance of others. If the address prefix contains too many hosts (e.g., a large prefix-length or "mask," encompassing many host addresses), load balancing may be difficult. Conversely, if a prefix is too granular (e.g., a small prefix-length or "mask," encompassing few host addresses), more prefixes are used to cover the possible addresses in the routing tables, thus consuming substantial table size.

BRIEF DESCRIPTION OF THE DRAWINGS

The advantages of the invention may be better understood by referring to the following description in conjunction with the accompanying drawings in which like reference numerals indicate identically or functionally similar elements, of which:

FIG. 3 illustrates an example routing table;
FIG. 5 illustrates an example of prefix consolidation.

DESCRIPTION OF EXAMPLE EMBODIMENTS

Overview

Figure 1:
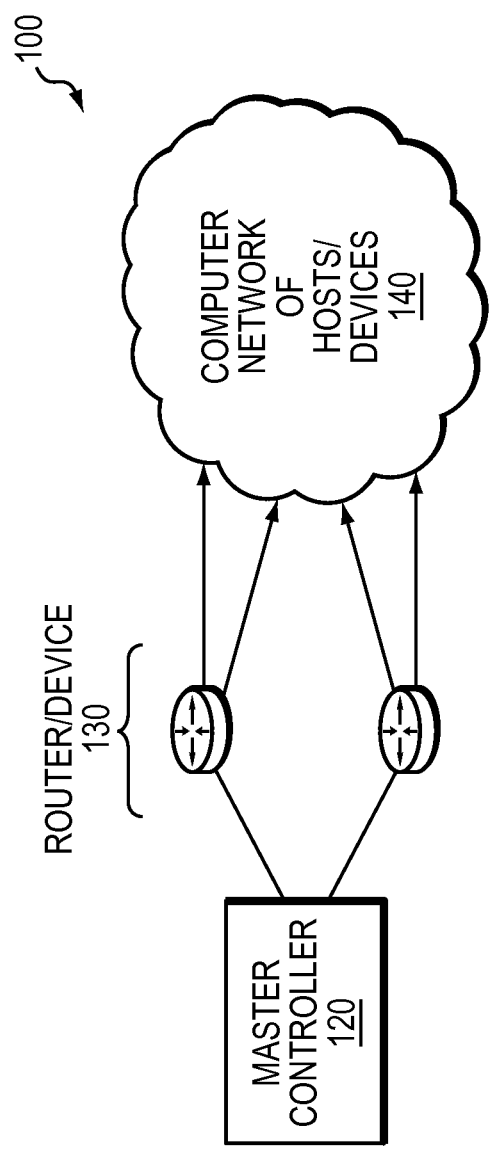
FIG. 1 illustrates an example computer network.

According to embodiments of the disclosure, performance parameters may be determined for each of a plurality of network address prefixes in a computer network. Based on the respective performance parameters, the prefixes may be resized through at least one of consolidation of adjacent prefixes and splitting of prefixes, and traffic may then be routed in the computer network based on the resized prefixes. For instance, according to one embodiment adjacent prefixes having configurably similar performance parameters may be consolidated into a consolidated prefix, while other prefixes may be split into adjacent split prefixes having configurably dissimilar performance parameters. Also, according to another embodiment, prefixes may be resized based on respective throughput to substantially equally distribute throughput load among a plurality of resultant prefixes.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100 illustratively comprising nodes/devices, such as one or more routers/devices 130 and an illustrative "master controller" 120 (described below) interconnected by links as shown. Also, a portion of the computer network 100 may comprise other hosts/devices 140, being addressable by an identifying network address, as will be understood by those skilled in the art. Those skilled in the art will also understand that any number of nodes, devices, links, etc. may be used in the computer network, and that the view shown herein is for simplicity. Further, while the embodiments described herein are described generally, they may apply to any network configuration within an Autonomous System (AS) or area, or throughout multiple ASes or areas, etc.

Data packets (e.g., traffic) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

Figure 2:
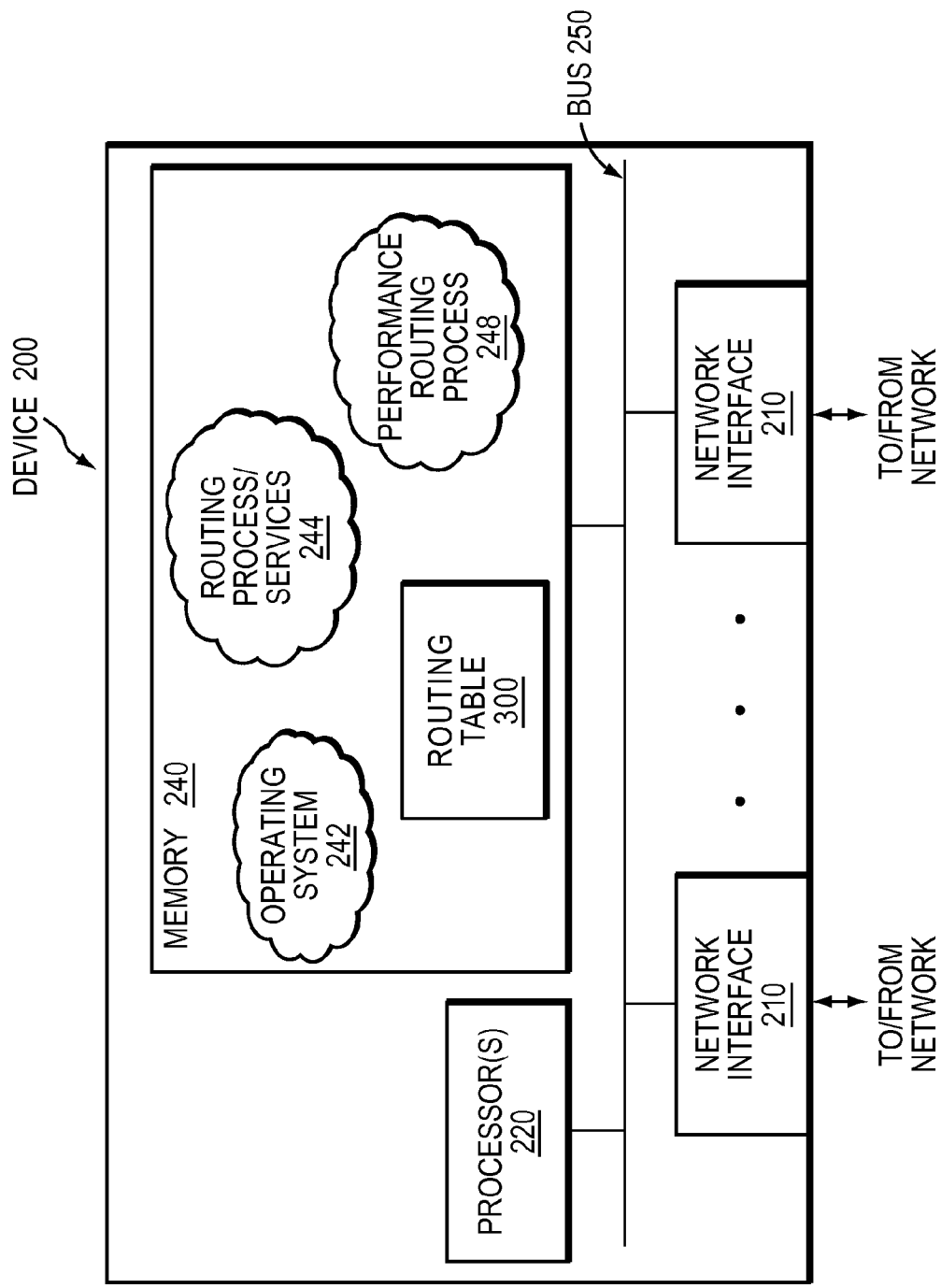
FIG. 2 illustrates an example network device/node.

FIG. 2 is a schematic block diagram of an example node/device 200 that may be advantageously used with one or more embodiments described herein, e.g., as a router 130 or as a master controller device 120. The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures, such as a routing table 300. An operating system 242 (e.g., the Internetworking Operating System, or IOS™, of Cisco Systems, Inc.), portions of which are typically resident in memory 240 and executed by the processor (s), functionally organizes the node by, inter alia, invoking network operations in support of software processes and/or services executing on the device. These software processes and/or services may comprise routing process/services 244 and an illustrative performance routing process 248 as described herein. It will be apparent to those skilled in the art that other types of processors and memory, including various computer-readable media, may be used to store and execute program instructions pertaining to the inventive technique described herein.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a routing table 300 containing, e.g., data used to make routing decisions for destination address prefixes. (Notably, a prefix, as defined generally herein, refers to a subset of nodes within the computer network.) In particular, changes in the network topology may be communicated among devices 200 using routing protocols, e.g., to "converge" to an identical view of the network topology. Notably, routing services 244 may also perform functions related to virtual routing protocols, such as maintaining VRF instances (not shown), or tunneling protocols, such as for Multi-Protocol Label Switching, etc., each as will be understood by those skilled in the art.

To improve upon conventional routing protocols, network administrators sometimes implement additional optimizations to increase network performance. For example, a load-balancing or cost-minimizing procedure may be used in conjunction with traditional routing protocols to redistribute data flows, such as those entering or exiting a multi-homed routing domain or AS. For example, the devices 130 in the network may be configured to periodically select a best path for a given destination prefix (a monitored and/or controlled prefix) based on performance, load, cost, and service level agreements (SLAs) associated with connections to an Internet service provider (ISP), etc. Ultimately, the end result for the enterprise network is improved Internet performance, better load distribution, and/or lower costs for Internet connections. These additional procedures may require the devices to collect various network statistics associated with the data flows.

In particular, performance routing process 248 may contain computer executable instructions executed by processor 220 to perform functions relating to these added routing capabilities, in addition to the techniques described herein in accordance with one or more illustrative embodiments. For instance, performance routing process 248 may be employed by a router 130 and/or the master controller 120. That is, the routers 130 may each individually perform the processes associated with performance routing, or may work in conjunction with the master controller to, e.g., monitor of a set of address prefixes to obtain network statistics corresponding to the monitored prefixes. (Note that instances of the performance routing process 248 may execute on the network interfaces 210.) The statistics, which may be collected by the routers and sent to the master controller, may correspond to various traffic measurements, such as delay, round-trip times (RTT), data throughput (i.e., the amount of data transferred or received), packet loss, reachability, etc. In general, the performance routing processes 248 may measure any arbitrary traffic metric, including conventional cost-based and distance-based metrics, as well as calculating statistical averages, variances, medians, etc. of a collection of traffic measurements.

Techniques that may be used to monitor prefixes comprise passive monitoring and/or active probing. Passive monitoring relies on gathering information from routers learned from monitoring conventional user traffic, such as throughput, timing, latency, packet loss, reachability, etc. (An example software application that may be used to collect the network statistics at the border nodes is NetFlow™ by Cisco Systems, Inc.) Active probing, on the other hand, relies on probe packets to measure various performance parameters associated with accessing the monitored prefix from an originating node (source). Here, the originating node may generate multiple probe packets that are then forwarded via different exit interfaces (e.g., data links) on different paths to target nodes (targets) in the monitored (destination) prefix. Upon receiving the probe packets, the targets respond to the originating node, e.g., with return packets or other known probe responses. The originating node may eventually acquire the responses and use them to measure various parameters, such as delay, loss, jitter, and reachability, etc., associated with accessing the destination prefix via the different links.

In one example implementation, the measurements and/or statistics may be analyzed by the master controller 120, which may determine whether the distribution of traffic within the network (e.g., entering and/or leaving an autonomous system) can be optimized, e.g., according to one or more policies. If so, the traffic routed through the network may be redistributed by, e.g., statically changing the routing table contents of the routers 130, associating new preference values (e.g., BGP values) with selected traffic, etc. In that sense, the master controller 120 selects optimal paths/routes to various destination prefixes. Notably, the master controller may be distributed among a plurality of nodes, and thus need not reside in a single master controller device (for example, a router may both monitor the quality of its links and select a path/route for traffic). Also, it is not necessary for a master controller 120 to contain routing processes or routing tables, other than what is necessary for communication with the routers 130.

Policies, in general, may be based on a user, a device, a subnetwork, a network, or an application. In addition to defining rules used to select a best path, however, policies may also be defined to govern performance characteristics for a particular prefix. Once a best path has been selected, it is important to verify that the path maintains acceptable performance characteristics, and that the current path is still, in fact, the best path. For instance, while a certain performance characteristic for a particular prefix conforms to the defined policy (i.e., over the current path), the prefix is considered to be "in-policy," and traffic remains on the current (best) path. These policies often take the form of an upper (or lower) threshold on a particular performance characteristic that should not be surpassed. For example, in the case of voice traffic (e.g., voice over IP, or VoIP), a policy may be defined indicating that the RTT should be less than 50 milliseconds (ms). If the measured RTT is, e.g., 40 ms, the prefix is considered to be in-policy. In the event, however, the performance characteristic for a particular prefix does not conform to the defined policy (e.g., 60 ms), the prefix is considered to be "out-of-policy" (OOP), and the node may be required to select an alternate path.

As another example, a link utilization threshold policy ("link policy") may be used to define a threshold on the amount of traffic (traffic load) one or more links may carry. Such link policies may define a range among a plurality of links, where each of the links must maintain a traffic load that is within a certain percentage of the traffic load for the other links (e.g., for load balancing). That is, links are generally fixed, in that they have a certain capability (e.g., bandwidth, cost, delay, etc.) and connectivity (e.g., physical connection from a first node to a second node). Because of this, when a link goes OOP, one available solution is to redirect traffic traversing that OOP link onto one or more other links that are currently in-policy. Once certain traffic, e.g., to one or more prefixes, has been redirected from the OOP link, the link may become in-policy with less traffic. One problem associated with redirecting prefixes between links is that occasionally the available prefixes are larger (e.g., utilize more bandwidth) than necessary to effectively (optimally) redirect traffic from a link to bring it in-policy. For instance, 10 Kilobytes per second (KBps) of traffic may need to be redirected from a link for policy reasons, but the smallest existing prefix in the routing table may utilize 20 KBps. Redirecting the entire 20 KBps prefix may be inefficient and/or sub-optimal when only 10 KBps needs to be redirected.

As noted above, network devices typically use routing tables 300 to direct traffic within a computer network based on address prefixes. That is, the table 300 stores the prefixes and a "best route" (based on various factors) over which to route any received packets destined to an address within that prefix. FIG. 3 is a simplified view of an example routing table 300 that may be used in accordance with the present disclosure. Routing table 300 is illustratively stored in memory 240 and includes one or more entries 320, each comprising a plurality of fields for storing a reachable destination address prefix 305 (e.g., X1, X2, Y, etc.), and a corresponding routing decision 310 (e.g., represented simply as "path 1," "path 2," etc.), such as a next-hop interface/address and optionally other information (e.g., associated metrics/costs of reaching the destination, local preference values, tags, etc.) as may be appreciated by those skilled in the art. As noted, the routing table 300 is illustratively maintained and managed by routing process 244 (e.g., a routing information base, or RIB). Accordingly, routing process 244 populates the routing table 300 with learned reachable prefixes based on received advertisements (e.g., IGP, BGP, etc.), and/or with configured reachable prefixes (e.g., input by a system administrator), as will be understood by those in the art.

A prefix, as understood by those skilled in the art, may generally describe a subset of nodes in a computer network. For example, a mask length ("mask_length"), often denoted as "/N," is a representation of the number of most significant address bits shared by nodes within a certain address prefix. Therefore, a smaller number of shared significant bits creates a prefix (e.g., /8) that is larger than a prefix created from a larger number of shared significant bits (e.g., /24). As a simple example, assume two 32-bit address prefixes, 10.10.10.0/24, and 10.10.10.10/32. Here, the /24 prefix includes host addresses 10.10.10.1 through 10.10.10.254, sharing the same first 24 significant bits (note that 0 and 255 are special addresses), while the /32 prefix only includes host address 10.10.10.10, the only shared combination of all 32 bits. Because the /32 prefix describes a smaller subset of nodes (i.e., a node with the address 10.10.10.10) than the /24 prefix (i.e., 254 hosts), the /32 prefix is "smaller" than (i.e., is "more specific than") the /24 prefix. Also, because the address prefix 10.10.10.10/32 (i.e., node 10.10.10.10) falls within the address prefix 10.10.10.0/24 (i.e., 10.10.10.1 through 10.10.10.254), the /24 prefix is said to be a "parent prefix" for the /32 prefix. For example, X1 as shown in table 300 is a /24 prefix, while X2 is a /30, a more specific subset of nodes than the /24 X1 prefix.

Notably, as mentioned above, there is generally little or no consideration of the volume and performance of the traffic being directed within routing tables, and the "best route" decisions are typically made on static factors. In particular, applying a routing policy to a prefix may benefit the performance of certain hosts/subnets within the prefix, while degrading the performance of others. For example, BGP may advertise a /24 prefix, though the hosts/nodes within that /24 prefix may be geographically diverse, and may have substantially different performance characteristics (e.g., delay in reaching the hosts). Moreover, if the address prefix contains too many hosts (e.g., a large prefix-length or mask, encompassing many host addresses), load balancing may be difficult. On the other hand, if a prefix is too granular (e.g., a small prefix-length or mask, encompassing few host addresses), more prefixes are needed to cover the possible addresses in the routing tables, thus consuming substantial table size. The techniques described herein, therefore, dynamically organize the prefix-length (mask) based on the actual traffic throughput and performance characteristics.

Right-Sizing Address Prefixes

According to embodiments of the disclosure, address prefixes may be resized based on their respective performance parameters through either consolidation of adjacent prefixes or splitting of prefixes or both, and traffic may then be routed in the computer network based on the resized prefixes. For instance, according to one embodiment adjacent prefixes having configurably similar performance parameters may be consolidated into a consolidated prefix, while other prefixes may be split into adjacent split prefixes having configurably dissimilar performance parameters. Also, according to another embodiment, prefixes may be resized based on respective throughput to substantially equally distribute throughput load among a plurality of resultant prefixes.

Illustratively, the techniques described herein may be performed by hardware, software, and/or firmware, such as in accordance with the performance routing process 248, which may contain computer executable instructions executed by the processor 220 to perform functions relating to the novel techniques described herein, e.g., in conjunction with routing process 244 operating in a conventional manner.

Generally, there are two cases where a prefix mask might benefit from adjustment: I) where the prefix has too many hosts and needs to be split for more efficient handling; or II) where there are too many routes (e.g., internet full routes) and it may be beneficial to reduce the number of routes to conserve router resources while maintaining the performance of the traffic and the ability to load balance effectively. More specific routes, host routes, or even flow routes may be used to alleviate the concern of case I, though if too many specific routes are used, then possibly causing case II because of limitations of router resources. For example default routing (all addresses use the same "default" route) typically consumes the least resources but most often cannot manage load and performance. Host routing (a route for each address is handled individually), on the other hand, can achieve performance and load goals, but the number of host routes needed may be more than the router's processor and memory can maintain.

According to one or more techniques described herein, therefore, performance routing process 248 may manage performance and load with an efficient set of prefixes by dynamically summarizing prefixes based on performance and throughput boundaries. That is, larger prefixes may be split into more granular prefixes for better performance and better load sharing, while smaller prefixes or host routes may be consolidated into fewer larger prefixes, without sacrificing the performance of specific routes or load balancing. Accordingly, performance parameters/characteristics of the prefixes may be taken organized along summarized boundaries such that traffic along those summarized boundaries have similar performance.

The strategy herein can be extended to include any suitable performance parameters, such as delay, round trip time (RTT), jitter, available bandwidth, utilized bandwidth, packet loss, etc. Note that the examples below generally refer to delay as the performance parameter used, others may be used accordingly, as well as combinations of parameters as desired. In particular, it is reasonable to assume that prefixes within close geographical proximity have similar performance characteristics. If we take the example of an Internet deployment, where a router in the United States has a default route to host sites within the United States, Europe, Asia, etc., then those skilled in the art may appreciate that US-Europe, US-Asia, and US-US paths through the network may all have different traffic characteristics. The techniques described herein would thus split the prefix (default route in this example) based on the characteristics (e.g., similar delay) for better performance and manageability. Conversely, if the United States router had many separate specific prefixes to, say, Japan, then it may be beneficial to consolidate those specific prefixes if they have roughly the same performance characteristics.

Operationally, the resizing techniques, described in more detail below, may be performed in response to a number of stimuli. In particular, in addition to performing the resizing in response to a manual trigger (e.g., from an administrator) and expiration of a timer (e.g., periodically), the resizing may also be performed based on monitored performance parameters. That is, if the system (performance routing process 248) is already monitoring the prefixes (e.g., for other reasons or not), then a standard deviation value of a particular performance parameter may be determined, and compared to one of two thresholds. The first threshold indicates that splitting a prefix may be beneficial if the deviation within a single prefix is greater than the configurable threshold. The second threshold may be applied to two (or more) adjacent prefixes to determine whether the deviation is less than the configurable threshold, and if so, consolidation of the prefixes may be beneficial.

Further, a policy-based need, on the other hand, may arise when one or more predefined policy-based events (e.g., out-of-policy, "OOP," events) occur that would more optimally require action on prefixes that are smaller (e.g., utilizing less total bandwidth) than existing prefixes in the routing table. For example, in the event that 10 Kilobytes per second (KBps) of traffic needs to be redirected for policy reasons (e.g., surpassing a bandwidth utilization threshold), but the smallest existing prefix in the routing table utilizes 20 KBps, a need may exist to split that 20 KBps prefix into two separate prefixes, each at 10 KBps, so that one split prefix may be redirected accordingly. Also for example, a prefix may have become OOP based on a maximum allowable delay for a particular link. Specifically, one portion of a particular prefix may contain the offending delay values, and as such, it may be beneficial to redirect only that portion of the prefix to a more lenient link (i.e., with less strict delay policies). Other OOP events, such as, e.g., surpassing various thresholds, access restrictions, or even partial prefix reachability loss, etc., may also benefit from the ability to have smaller portions of a particular prefix upon which policy-based routing may be administered.

Depending upon the cause of the trigger, the performance routing process(es) 248 may decide to either split prefixes or consolidate the prefixes in order to more optimally size them ("right-sizing" the prefixes). Alternatively, the trigger may simply initiate performance of both resizing directions, i.e., splitting and consolidating, in order to globally adjust prefix boundaries accordingly.

An illustrative example technique that may be used for splitting a prefix of the into at least two adjacent split prefixes having configurably dissimilar performance parameters is described with reference to FIG. 4. Briefly put, a prefix is split into two sub-prefixes, and performance parameters (e.g., delay) are collected/measured for a period of time thereafter (for simplicity, consider delay as the only performance criteria). The difference in delay may then be calculated, and if the difference is greater than or equal to the configurable threshold (i.e., the performance parameters are configurably dissimilar), then prefix split was acceptable, and is retained. If, on the other hand, the difference is less than the threshold, then the previous steps may be repeated for the resultant sub-prefixes, since it is possible that the difference could be higher than the threshold if additional splits are performed.

Figure 4:
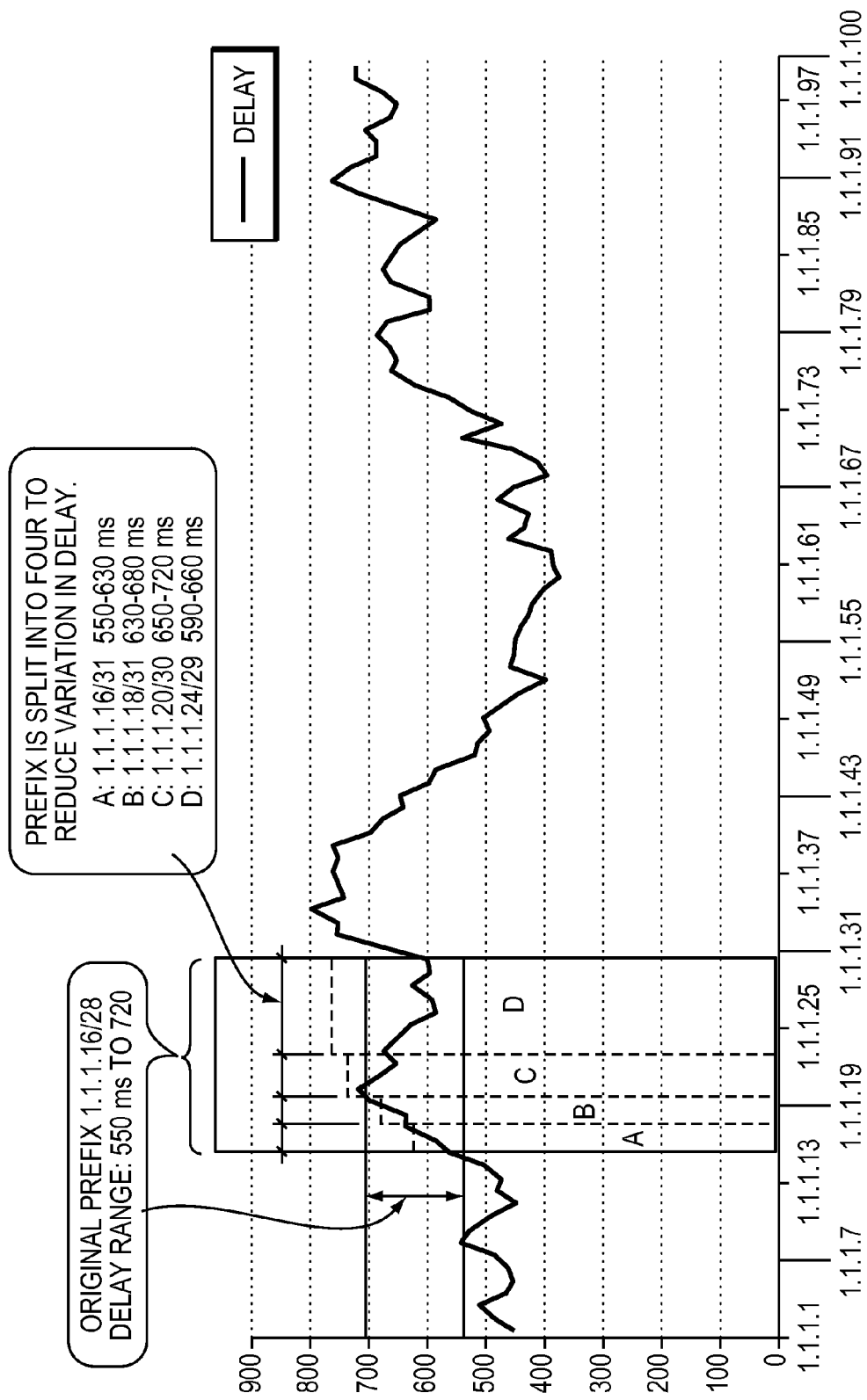
FIG. 4 illustrates an example of prefix splitting.

More specifically, as shown in FIG. 4, it is roughly demonstrated that a prefix 1.1.1.16/28 has a round trip delay range of 550 ms to 720 ms (e.g., a wide range, possibly suggesting that the prefixes are in different geographic locations). Applying a mass policy to this prefix may not be particularly efficient. According to the techniques described herein, therefore, the prefix may be dynamically split (e.g., into four sub-prefixes), which individually have performance measurements that are within a small range. Assume, for the example, that the eligible difference in delay "D" is 50 ms, a duration for monitoring post split performance is "Tm" (e.g., seconds or minutes), and a number of split iterations is "I" (e.g., three).

The original prefix: 1.1.1.16/28 has an average delay of 635 ms, but the deviation is quite large (from 550 ms to 720 ms). By first splitting the original prefix into two /29 prefixes, 1.1.1.16/29 ("ABC") and 1.1.1.24/29 ("D"), the performance (delay) of the newly split prefixes may be measure for time Tm, illustratively resulting in average delays of 635 ms each. There is no apparent difference as a result of this split (based on average delay, since the deviation has, in the example, changed between the two sub prefixes), so the illustrative technique may perform a second split iteration on each of the sub-prefixes (ABC and D). The first sub-prefix may be split again into 1.1.1.16/30 ("AB") and 1.1.1.20/30 ("C"), and performance may again be measured. Assuming now that the AB prefix has an average delay of 615 ms, and the C prefix has an average delay of 685 ms, the performance parameters for the two sub-prefixes are configurably dissimilar (greater than 50 ms apart), so the split may be retained. Note also, that each of the newly split prefixes AB and C may be further split (e.g., a third iteration into /31 prefix masks), where it may be determined that prefix AB may be beneficially split into 1.1.1.16/31 ("A") and 1.1.1.18/31 ("B"), while prefix C may not be further split advantageously. Assuming, then, that the split of prefixes C and D were not successful, the re-suiting suiting prefixes are A (1.1.1.16/31), B (1.1.1.18/31), C (1.1.1.20/30), and D (1.1.1.24/29), as shown. Had none of the iterations resulted in a beneficial split, then the original /28 prefix would continue to be used for routing traffic. (Note that prefixes B and C would not result in a "BC" prefix based on their similar characteristics, since there is no prefix boundary that could combine 1.1.1.18/31 (B) and 1.1.1.20/30 (C).)

Note that the above technique may be performed by first measuring the delay values across the spectrum of host addresses within the prefix (such as by "splitting" the prefix for measurement purposes only) and then making the decisions, or by splitting the original prefix into sub-prefixes, and then monitoring the resulting performance characteristics and retaining the split if the characteristics are configurably dissimilar. In essence, the splitting algorithm is much like a tree, where an initial prefix-length (mask), e.g., /28, is divided into two /29 prefixes, which may each be split into two /30 prefixes, and then to /31, etc. Had the original prefix been a /16, then the illustrative three iterations ("I") would result in two /17 prefixes, which may be split into four /18 prefixes, which may be finally split into eight /19 prefixes. Note that the prefixes as a result of the final iterations may be further split at a later time, or the iterations may only be applied to non-dissimilar prefixes (e.g., such that if a benefit continues to be found, the prefixes continue to be split, but if no benefit is found for "I" iterations, then the algorithm is stopped for that portion of the "tree").

In reverse, adjacent prefixes having configurably similar performance characteristics may be consolidated into a larger prefix. For instance, with reference to FIG. 5, an example technique is shown that may be used to consolidate adjacent prefixes that have configurably similar performance parameters into a consolidated prefix. For example, FIG. 5 demonstrates that prefixes 2.1.1.32/28 ("A") and 2.1.1.48/28 ("B") have similar delay characteristics (delay in the range of 520-620 ms). It may thus be determined that these prefixes are within a configurable threshold (e.g., their average delays are within 10 ms of each other), so combining them could be more efficient for storage and maintenance within routing table 300. The techniques described herein may thus combine both prefixes into 2.1.1.32/27 ("AB"), while still maintaining the performance of the individual prefixes. In this manner, where some routes would benefit from consolidation (e.g., in the case with full Internet /32 routes), the goal would be to reduce the number of prefixes by consolidating them along the performance and throughput boundaries to reduce the number of routes managed while maintaining load and performance goals.

Note that a hybrid splitting/consolidating technique may also be used, such that a first prefix (e.g., a default route or any other prefix) is split into a plurality of sub-prefixes equally sized to a configured granularity (e.g., dividing a /18 into sixteen /22 prefixes, etc.), performance parameters are measured for each of the sub-prefixes, and then adjacent sub-prefixes having configurably similar performance parameters may be consolidated into a best fit scenario (e.g., some /22 prefixes, some /21, etc.). The original prefix may, but need not, be a prefix originally found within the routing table 300. For example, the original /18 prefix in the example may have been manually configured or otherwise determined. Depending on processing power and resource usage, this concept may be applied anywhere from splitting a /0 prefix into /32 prefixes, and anywhere in between, and combining any similarly performing adjacent prefixes.

Once the prefix resizing has been performed, either splitting or consolidating, a prefix may be subject to a verification state for a verification time "Tv." During this time, it should be confirmed that the difference is still suitable, e.g., larger than D after splitting, and smaller than D post consolidation. After time Tv, prefixes may remain resized until resized later (e.g., resizing in the same direction or reverting the original resize) or until another input to the prefix is made (e.g., manual reconfiguration). During the verification time, resized prefixes may not be eligible for further resizing (in the same direction or in reversion). Also, a hold-down timer may be used to prevent excess churn, such that once a prefix has been split or combined, the hold-down timer may be applied to prevent reversion (e.g., combining a recently split prefix or splitting a recently combine prefix) or further splits (e.g., splitting previously split prefixes further, combining previously combined prefixes further, etc.). Note further that if it is determined after the hold-down timer that a reversion loop is occurring (reverting between split and combined repeatedly), then a configurable number of iterations may be allowed before ceasing the reversion loop (i.e., preventing further splits/consolidations).

Figure 6A:
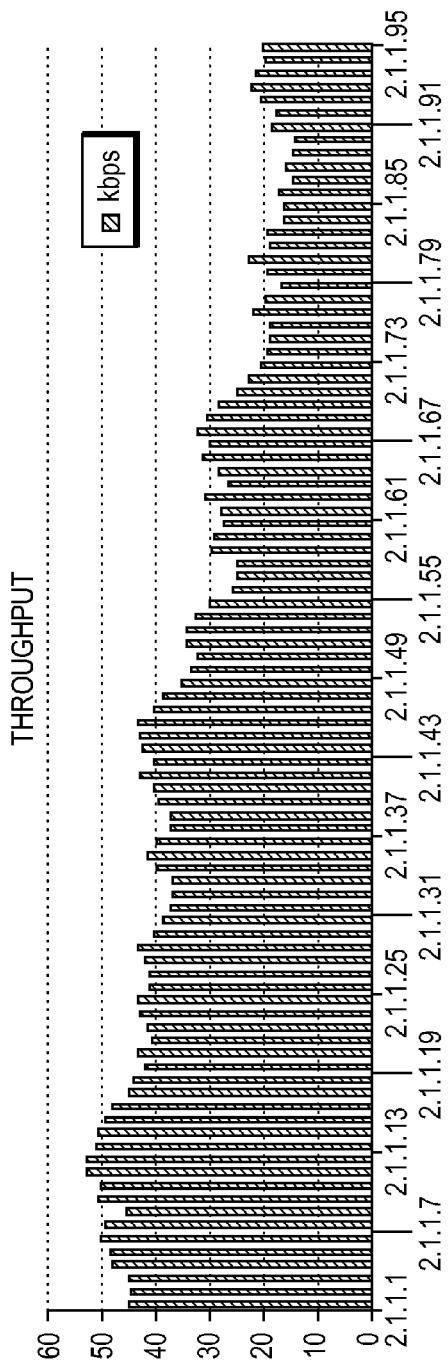
FIGS. 6A-B illustrate an example of throughput balancing.
Figure 6B:
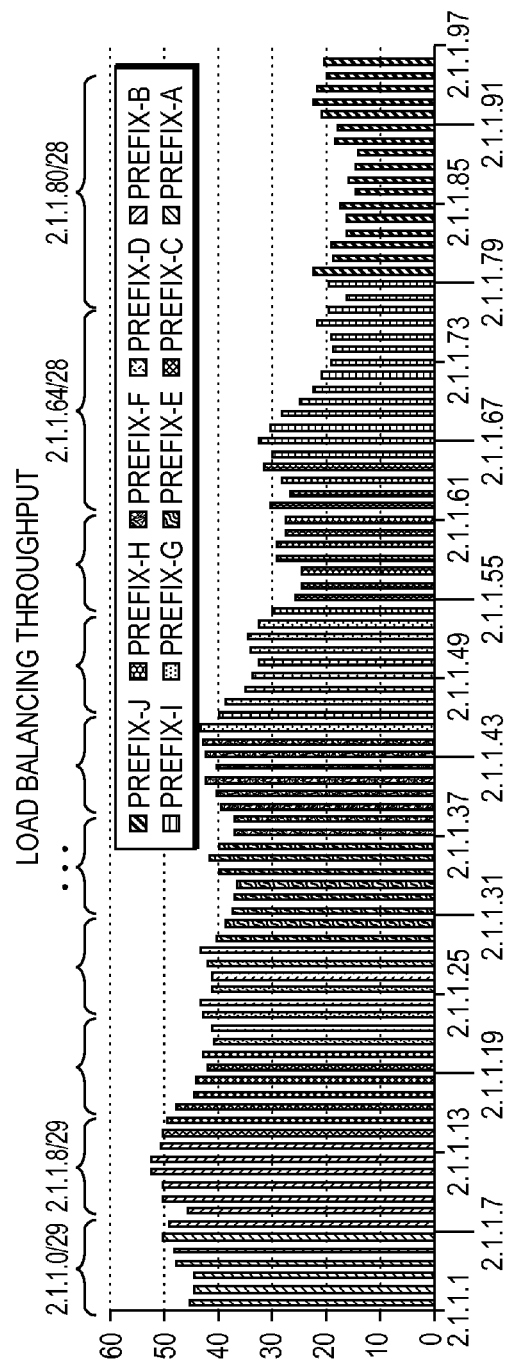

In accordance with one or more embodiments described herein, prefixes may also be split or consolidated for load balancing throughput. For instance, FIGS. 6A-B illustrate that a larger prefix may be split into a configurable number of substantially equal throughput smaller prefixes. That is, throughput for each of a plurality of measured prefixes at a desired granularity may be determined (in the example in FIG. 6A, a /32 granularity is shown for a portion of a 2.1.1.1/25 prefix), and then the measured prefixes may be resized (e.g., consolidating the measured prefixes or splitting the larger prefix, depending upon perspective) based on the respective throughput to substantially equally distribute throughput load among the plurality of resultant prefixes.

For example, as shown in FIG. 6B, assuming that ten equal load prefixes are desired, the result is eight prefixes of /29 prefix-length and two prefixes of /28 prefix length, such that the throughput is roughly the same for each prefix (e.g., the area under the bars in the graph roughly equal one another). Note that the load is rough (substantially similar/equal), since the prefix boundaries may not fall exactly where necessary to make perfectly equal load distribution. Various mathematical algorithms known to those skilled in the art may be used to distribute the measured load into the desired number of areas, modified to fit closely within prefix boundaries according to the techniques herein. Illustratively, this may be particularly useful where a user (e.g., a system administrator) defines a desired number of prefixes, such as for load balancing traffic to a particular original (larger) prefix across a known number of links (e.g., exits from a network). Alternatively, the administrator may simply desire to have a certain number of smaller prefixes for greater load balanced control. These resultant prefixes may then be re-measured and resized to maintain load-balancing where the throughput may change over time.

Once any of the above techniques have been applied, traffic in the computer network may thus be routed based on the resized prefixes, accordingly. For instance, one or more performance based routing techniques may be applied to the resized prefixes, where the routers 130 or the master controller 120 may apply various performance policies to the prefixes. In particular, where the master controller is used, it may inform the routers 130 of the resized prefixes for routing the traffic and/or the performance based routing of the resized prefixes, accordingly. For example, a more optimal amount of bandwidth may be redirected, different policies may be applied more specifically to smaller prefixes, smaller (split) prefixes may be routed over different links, fewer (combined) prefixes need be maintained or managed, etc. Those skilled in the art will understand that the resized prefixes may be controlled (e.g., managed, optimized, advertised, redirected, etc.) in the same manner as conventional prefixes, in that they are conventional prefixes, but optimally created (resized) in response to monitored characteristics. (Notably, routing information for the one or more resized prefixes may be distributed into the surrounding network, or the scope of distribution may be limited to within the local network such as, e.g., for security and/or competitive purposes.)

In addition, while the techniques above apply a configurable similarity/dissimilarity to traffic characteristics in general, according to one or more embodiments herein the decisions may be based on traffic class. For instance, voice traffic may be afforded more splits (further iterations or smaller configurable dissimilarity) for better control, while data traffic may be combined more (further iterations or larger configurable similarity) in order to relieve router resources.

Figure 7:
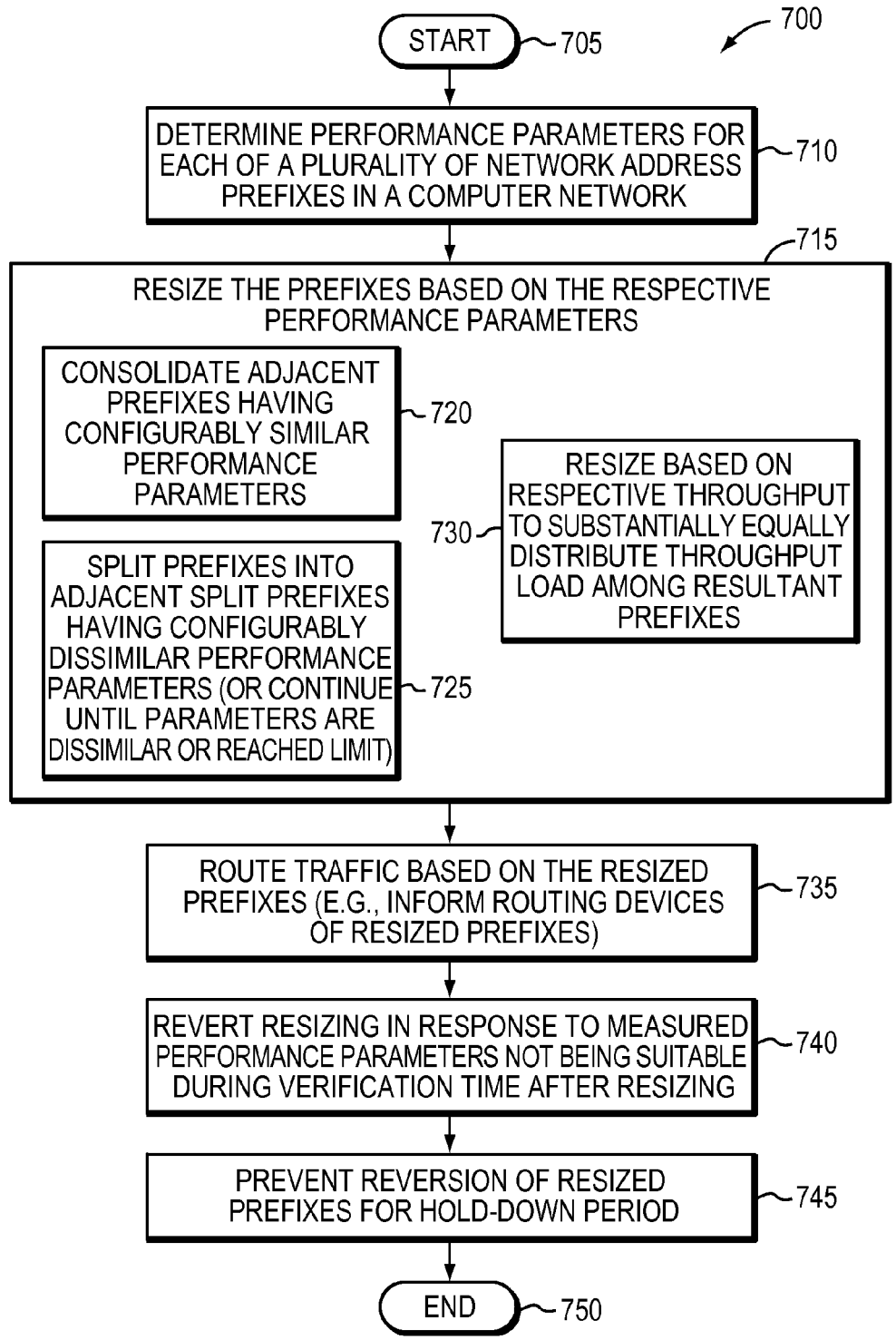
FIG. 7 illustrates an example procedure for right-sizing prefixes.

FIG. 7 illustrates an example procedure for dynamically right-sizing address prefixes in accordance with one or more embodiments described herein. The procedure 700 starts at step 705 (e.g., in response to a periodic timer, manual triggering, or other reason, as described above), and continues to step 710, where performance parameters for each of a plurality of network address prefixes may be determined. (Notably, as mentioned above, the performance parameters may be measured after resizing the prefixes, and the example procedure order herein is merely illustrative.) In step 715, prefixes may be resized (e.g., by master controller 120 or devices 130) based on the respective performance parameters. For example, where the performance parameters are measured first, in sub-step 720 adjacent prefixes having configurably similar performance parameters may be consolidated. Conversely, in sub-step 725, prefixes may be split into adjacent split prefixes having configurably dissimilar performance parameters, e.g., by splitting then measuring the parameters, or by measuring in advance and then splitting correspondingly. As mentioned above, if the splits do not result in dissimilar parameters initially, the splitting may continue in sub-step 725 until parameters are dissimilar or until a limit is reached. Also, as in sub-step 730, it is also possible that the resizing is based on respective throughput to substantially equally distribute throughput load among resultant prefixes, as shown and described above.

Once the prefixes have been resized, any received traffic may be routed based on the resized prefixes in step 735, such as by devices 130, which have either performed the resizing themselves, or have been informed of the resizing from master controller 120. Based on one or more embodiments herein, then, in response to measured performance parameters of a resized prefix not being suitable during a verification time, the resizing may be reverted in step 740. Otherwise, in step 745, reversion of resized prefixes may be prevented for a holddown period in order to prevent network churn caused by repeatedly splitting and then consolidating the same sets of prefixes. The procedure 700 ends in step 750, notably with the ability to return to any of the steps above, such as to re-measure performance parameters, resize prefixes, re-route traffic, etc., where in the end, the result may generally be a mix of some prefixes that have been split and some that have been consolidated.

Advantageously, the novel techniques described herein dynamically right-size address prefixes in a computer network. By creating arbitrary prefix boundaries based on network performance parameters, thus splitting or combining prefixes based on traffic-statistics (that can change with time), the novel techniques allow for greater control and efficient management over prefix performance and distributed load. In particular, the techniques described above may be used to provide for more efficient load balancing, better performance for prefixes and the network in general, and reduced overhead and resource utilization through consolidation. Also, the dynamic aspects of one or more embodiments described herein alleviate the need for cumbersome and inefficient manual configuration.

While there have been shown and described illustrative embodiments that dynamically right-size address prefixes in a computer network, it is to be understood that various other adaptations and modifications may be made within the spirit and scope of the present disclosure. For example, the embodiments have been shown and described herein for use with performance routing processes. However, the embodiments of the disclosure in their broader sense are not so limited, and may, in fact, be used with routing generally and other types of route optimization processes. Also, while the disclosure has been shown and described using representative IPv4 32-bit addresses, the disclosure may, in fact, be used with IPv6 128-bit addresses, or other address formats, as will be understood by those skilled in the art.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:

determining performance parameters for each of a plurality of network address prefixes in a computer network, each performance parameter measuring a characteristic of traffic associated with a network address prefix;

resizing the prefixes based on the respective performance parameters, the resizing comprising at least one of:
  i) consolidating adjacent prefixes of the plurality of network address prefixes having configurably similar performance parameters into a consolidated prefix, or
  ii) splitting a prefix of the plurality of network address prefixes into at least two adjacent split prefixes having configurably dissimilar performance parameters; and storing the resized prefixes in a routing table;

routing traffic in the computer network based on the resized prefixes in the routing table;

measuring the performance parameters of a resized prefix for a verification time after resizing; and reverting the resizing in response to the performance parameters of the resized prefix not being suitable, suitable performance parameters being one of either remaining within configurably similar performance parameters post consolidation of prefixes or maintaining configurably dissimilar performance parameters post splitting of prefixes.

2. The method as in claim 1, wherein splitting for resizing comprises:
   splitting a first prefix into two adjacent split prefixes;
   measuring performance parameters for the two split prefixes;
   determining whether the performance parameters of the two split prefixes are configurably dissimilar; and
   in response to determining that the performance parameters of the two split prefixes are configurably dissimilar, retaining the two split prefixes.

3. The method as in claim 2, further comprising:
   in response to determining that the performance parameters of the two split prefixes are not configurably dissimilar, continuing to split the two split prefixes for a configured number of iterations; and
   in response to determining that the performance parameters of split prefixes are not configurably dissimilar after splitting the prefixes for the configured number of iterations, utilizing the first prefix for routing traffic.

4. The method as in claim 2, further comprising:
   in response to retaining the two split prefixes, splitting at least one of the two split prefixes into respective sub-prefixes;
   measuring performance parameters for each of the respective sub-prefixes;
   determining whether the performance parameters of the respective sub-prefixes are configurably dissimilar; and
   in response to determining that the performance parameters of the respective sub-prefixes are configurably dissimilar, retaining the sub-prefixes.

5. The method as in claim 1, wherein resizing is performed in response to at least one of either a manual trigger and expiration of a timer.

6. The method as in claim 1, further comprising:
   determining a performance parameter deviation within a prefix; and
   performing the splitting for resizing in response to the deviation being greater than a configurable threshold.

7. The method as in claim 1, further comprising:
   determining a performance parameter deviation between two adjacent prefixes; and
   performing the consolidating for resizing in response to the deviation being less than a configurable threshold.

8. The method as in claim 1, further comprising:
   applying one or more performance based routing techniques to the resized prefixes.

9. The method as in claim 1, wherein performance parameters comprise at least one parameter selected from a group consisting of: delay, round trip time, jitter, available bandwidth, utilized bandwidth, and packet loss.

10. The method as in claim 1, further comprising:
    preventing reversion of the resizing for a hold-down period after resizing.

11. The method as in claim 1, further comprising:
    splitting a first prefix into a plurality of sub-prefixes equally sized to a configured granularity;
    measuring performance parameters for each of the sub-prefixes; and
    consolidating adjacent sub-prefixes having configurably similar performance parameters.

12. The method as in claim 11, wherein the first prefix is a prefix not contained within the routing table.

13. A method, comprising:
    determining throughput for each of a plurality of network address prefixes;
    resizing the prefixes based on the respective throughput, resizing comprising at least one of consolidating two or more adjacent prefixes into a consolidated prefix having a smaller mask length than the two or more adjacent prefixes being consolidated or splitting one or more prefixes into two or more split prefixes having a greater mask length than the one or more prefixes being split, to substantially equally distribute throughput load among a plurality of resultant prefixes;
    storing the resultant prefixes in a routing table; and
    routing traffic in a computer network based on the resultant prefixes in the routing table;
    re-measuring throughput for each of the resultant prefixes; and
    resizing the resultant prefixes based on the respective throughput.

14. The method as in claim 13, wherein the plurality of network prefixes are a plurality of sub-prefixes equally sized to a configured granularity, the method further comprising:
    measuring throughput for each of the sub-prefixes; and
    consolidating adjacent sub-prefixes to substantially equally distribute throughput load among the plurality of resultant prefixes.

15. A method, comprising:
    determining performance parameters for each of a plurality of network address prefixes in a computer network, each performance parameter measuring a characteristic of traffic;
    detecting a manual trigger or expiration of a timer;
    resizing the prefixes based on the respective performance parameters, the resizing performed in response to the manual trigger or expiration of a timer, the resizing comprising at least one of:
    i) determining a difference between performance parameters of two or more adjacent prefixes of the plurality of network address prefixes is less than a first threshold, and, in response thereto, consolidating the two or more adjacent prefixes of into a resized prefix, or
    ii) determining a difference between performance parameters of two or more portions of a prefix of the plurality of network address prefixes is greater than a second threshold, and in response thereto, splitting the prefix into two or more adjacent split prefixes corresponding to the portions;
    storing the resized prefixes in a routing table; and
    routing traffic in the computer network based on the resized prefixes in the routing table.

16. A method, comprising:
    determining performance parameters for each of a plurality of network address prefixes in a computer network, each performance parameter measuring a characteristic of traffic;
    determining a deviation of the performance parameters of a prefix or a deviation of the performance parameters of two or more adjacent prefixes;
    resizing the prefixes based on the respective performance parameters, the resizing performed in response to the deviation of the performance parameters of the prefix being greater than a first threshold or the deviation of the performance parameters of the two or more adjacent prefixes being less than a second threshold, the resizing comprising at least one of:

i) determining a difference between performance parameters of the two or more adjacent prefixes of the plurality of network address prefixes is less than the first threshold, and, in response thereto, consolidating the two or more adjacent prefixes of into a resized prefix, or ii) determining a difference between performance parameters of two or more portions of the prefix of the plurality of network address prefixes is greater than the second threshold, and in response thereto, splitting the prefix into two or more adjacent split prefixes corresponding to the portions;

storing the resized prefixes in a routing table; and routing traffic in the computer network based on the resized prefixes in the routing table.

17. An apparatus, comprising:

one or more network interfaces configured to communicate with devices in a computer network;

a processor coupled to the network interfaces and configured to execute one or more processes; and a memory configured to store a performance routing process executable by the processor, the performance routing process when executed operable to:

determine performance parameters for each of a plurality of network address prefixes in a computer network, each performance parameter measuring a characteristic of traffic;

detect a manual trigger or expiration of a timer;

resize the prefixes based on the respective performance parameters, the resizing performed in response to the manual trigger or expiration of a timer, the resizing comprising at least one of:

i) determining a difference between performance parameters of two or more adjacent prefixes of the plurality of network address prefixes is less than a first threshold, and, in response thereto, consolidating the two or more adjacent prefixes of into a resized prefix, or ii) determining a difference between performance parameters of two or more portions of a prefix of the plurality of network address prefixes is greater than a second threshold, and in response thereto, splitting the prefix into two or more adjacent split prefixes corresponding to the portions;

store the resized prefixes; and route traffic in the computer network based on the resized prefixes.

18. An apparatus, comprising:

one or more network interfaces configured to communicate with devices in a computer network;

a processor coupled to the network interfaces and configured to execute one or more processes; and a memory configured to store a performance routing process executable by the processor, the performance routing process when executed operable to:

determine performance parameters for each of a plurality of network address prefixes in a computer network, each performance parameter measuring a characteristic of traffic;

determine a deviation of the performance parameters of a prefix or a deviation of the performance parameters of two or more adjacent prefixes;

resize the prefixes based on the respective performance parameters, the resizing performed in response to the deviation of the performance parameter of the prefix being greater than a first threshold or the deviation of the performance parameter of the two or more adjacent prefixes being less than a second threshold, the resizing comprising at least one of:

i) determining a difference between performance parameters of the two or more adjacent prefixes of the plurality of network address prefixes is less than the first threshold, and, in response thereto, consolidating the two or more adjacent prefixes of into a resized prefix, or ii) determining a difference between performance parameters of two or more portions of the prefix of the plurality of network address prefixes is greater than the second threshold, and in response thereto, splitting the prefix into two or more adjacent split prefixes corresponding to the portions;

store resized prefixes; and route traffic in the computer network based on the resized prefixes.

* * * * *